Patented June 15, 1937

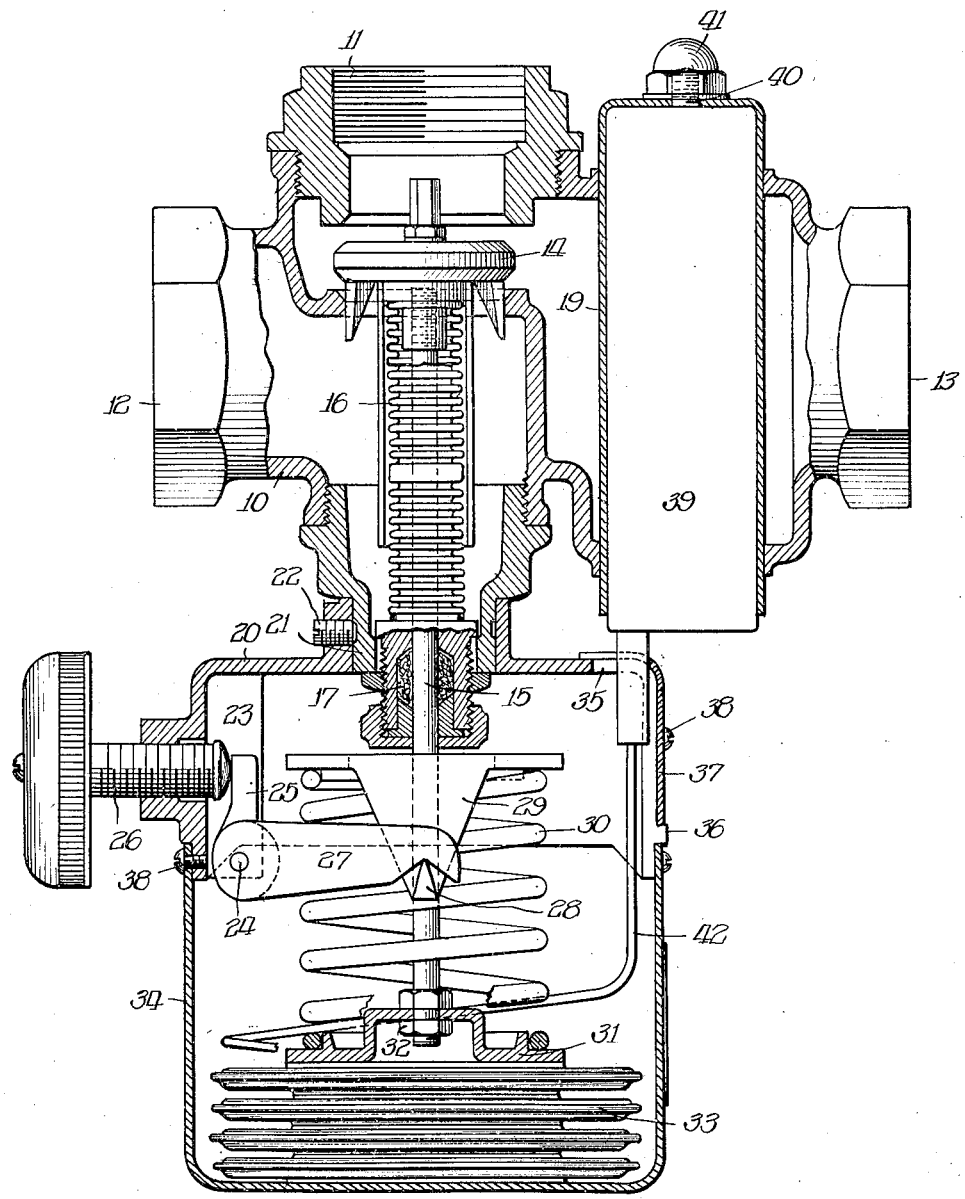

2,083,876

UNITED STATES PATENT OFFICE 2,083,876

THREE-WAY MIXING VALVE

Morton O. Snediker, Chicago, Ill., assignor to The Powers Regulator Company, Chicago, Ill., a corporation of Illinois Application September 4, 1936, Serial No. 99,385

7 Claims. (Cl. 236—12)

My invention relates to thermostatic mixing valves and particularly to a novel construction and arrangement thereof that will be hereinafter described.

It is commonly desirable to provide a thermostatic control device in connection with hot water heating systems that will permit considerable latitude in the temperature of the storage water with uniformity in the temperature of the water delivered to the service pipes.

It is also desirable to provide means whereby water at a high temperature may be delivered for certain uses, such as the kitchen and laundry of a dwelling and at a lower temperature to the bathroom where the danger of scalding may be present.

To that end, I have provided a thermostatic mixer, intended for installation in a supply line, in the nature of a three-way valve, the setting of which valve is controlled by a self-contained vapor-pressure thermostat. As an added improvement, I have so arranged the parts that the thermostatic control mechanism may be removed and replaced without disturbing the pipe connections or shutting off the water supply. This is a useful feature both for the user and the manufacturer for reasons that will be appreciated by those familiar with the subject.

The invention will be more readily understood by reference to the accompanying drawing; in which, The figure is a sectional view through a mixer constructed in accordance with my invention.

In the drawing I have shown a valve casing, indicated generally by the numeral 10. The casing provides a hot water inlet 11, a cold water inlet 12 and a mixed fluid outlet 13. The inlets are controlled by a double faced valve 14 having a stem 15 surrounded by a collapsible tube 16 which is arranged in a well-known manner to provide a packless joint. A packing gland 17 is provided for emergency use in case of breakage of the tube.

The outlet passage is enlarged to provide a mixing chamber 18 and seated in and extending across said chamber is a tube or well 19. This is sweated or otherwise permanently secured in place against liquid leakage. While I have shown the tube as composed of sheet metal and separate from the casing, it will be obvious that it may be formed as a part of the casting.

The motor assembly includes a two-part housing, the upper part or head 20 being firmly secured to the downwardly projecting nipple 21 of the bonnet of the valve casing by means of set screws 22. The head has a pair of internal ribs 23, only one of which is shown, which ribs provide a bearing for a cross pin 24 which serves as the pivot for a bell crank. One arm 25 of the bell crank is contacted by a hand screw 26 provided for adjusting purposes, while the other arms 27 of the bell crank engage lugs 28 on a saddle or yoke 29 that overlies a spring 30. At its lower end the spring is seated on a piston plate 31 to the center of which the valve stem 15 is connected by nuts 32. Underlying the piston plate is a bellows 33 carried on a shell 34 that constitutes the lower part of the housing. The head 20 of the housing is provided with a slot 35 at one side, with lugs 36 projecting exteriorly from the margins thereof and the shell has an upward extension 37 notched at its inwardly bent upward end. The shell is held in proper relation to the head by means of screws 38.

A bulb 39 is tightly fitted within the well 19, a threaded lug 40 on the upper end of the bulb projecting through an opening in the well and being engaged by a nut 41. A flexible tube 42 projects downwardly from the bulb and connects with the bellows; the notch 35 in the head 20 permits the tube to enter the motor housing.

The arrangement is such that upon disengaging the nut 41 and the screws 38 the shell may be dropped and the bulb and bellows readily removed and replaced. Thereafter the nut 32 may be removed from the valve stem and the set screw 22 backed off, whereupon the remainder of the motor assembly may be disengaged, all without requiring the draining of the water system. This is convenient if it is desired to change the range of delivery temperature for the mixed water or for making replacements or repairs.

I claim:

1. In a fluid mixer, the combination of a casing having hot and cold fluid inlets and an outlet for the mixed fluids, a tube projecting across said outlet, a valve for proportioning the admission of the hot and cold fluids, a shell separably connected to the casing, a bellows within the shell and connected to the valve for operating the same, and a bulb connected to the bellows, said bulb being removably mounted in said tube, whereby said shell, bellows and bulb may be separated from the casing without opening said casing.

2. In a fluid mixer, the combination of a casing having hot and cold fluid inlets and an outlet for the mixed fluids, a tube with imperforate walls projecting across said outlet, in such position that the fluids may flow around it, a valve for proportioning the admission of the hot and cold fluids, a shell separably connected to the casing, a bellows within the shell and connected to the valve for operating the same, and a bulb connected to the bellows, said bulb being removably mounted in said tube with its walls in heat-conducting relation to the walls of the tube, whereby said shell, bellows and bulb may be separated from the casing without opening said casing.

3. In a fluid mixer, the combination of a casing having hot and cold fluid inlets and an outlet for the mixed fluids, a tube with imperforate walls projecting across said outlet in such position that the fluids may flow around it, a valve for proportioning the admission of the hot and cold fluids, a housing removably connected to the casing, a vapor pressure motor within the housing, and a bulb having a flexible tube connection to the motor, said bulb being removably mounted in said tube with its walls in heat conductive relation thereto.

4. In a fluid mixer, the combination of a casing having hot and cold fluid inlets and an outlet for the mixed fluids, a tube with imperforate walls projecting across said outlet in such position that the fluids may flow around it, a valve for proportioning the admission of the hot and cold fluids, a motor housing connected to the casing and consisting of a head and a shell separably connected thereto, an adjusting member carried by the head, a piston plate, a spring confined between the member and the plate, said plate being connected to the valve, a bellows supported by the shell and bearing against the plate, and a bulb having a tubular connection to the bellows and removably mounted in said tube.

5. In combination, a valve casing having inlets for hot and cold fluids and an outlet for mixed fluid, the outlet passage being enlarged and a well being mounted across said enlarged passage, said well being sealed in place against the escape of fluid and having an open end, a valve in said casing having a stem projecting outside of the casing, a fluid pressure motor connected to the valve stem and a bulb having a flexible tubular connection to the motor and removably mounted in said well with its walls in heat transfer relation thereto.

6. In combination, a valve casing having inlets for hot and cold fluids and an outlet for mixed fluid, the outlet passage being enlarged and a well being mounted across said enlarged passage, said well being sealed in place against the escape of fluid and having an open end, a valve in said casing having a stem projecting outside of the casing, a fluid pressure motor connected to the valve stem and a bulb having a flexible tubular connection to the motor and removably mounted in said well with its walls in heat transfer relation thereto, said motor and bulb being detachable from the casing without opening the casing.

7. In combination, a valve casing having inlets for hot and cold fluids and an outlet for mixed fluid, the outlet passage being enlarged and a well being mounted across said enlarged passage, said well being sealed in place against the escape of fluid and having an open end, a valve in said casing having a stem projecting outside of the casing, a packless seal for the stem, a fluid pressure motor connected to the valve stem and a bulb having a flexible tubular connection to the motor and removably mounted in said well with its walls in heat transfer relation thereto.

MORTON O. SNEDIKER.